(12) United States Patent
Kato et al.

(10) Patent No.: US 6,925,254 B2
(45) Date of Patent: Aug. 2, 2005

(54) CAMERA APPARATUS (75) Inventors: Seiichi Kato, Kanagawa (JP); Takashi Ikenaga, Kanagawa (JP); Keikaku Fukuoka, Kanagawa (JP); Yoshitake Takahashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/633,178

(22) Filed: Aug. 1, 2003

(65) Prior Publication Data

US 2004/0096205 A1 May 20, 2004

(30) Foreign Application Priority Data

Aug. 5, 2002 (JP) .................................... 2002-227785

(51) Int. Cl.$^7$ .................... G03B 13/02; G03B 15/03; G03B 17/04; H04N 5/225
(52) U.S. Cl. .................... 396/177; 396/287; 396/350; 396/374; 348/333.06; 348/371; 348/376
(58) Field of Search ................ 396/348, 374, 396/176–178, 287, 350, 535; 348/333.06, 370, 371, 373, 376

(56) References Cited

U.S. PATENT DOCUMENTS

| 4,357,087 | A | * | 11/1982 | Ikawa et al. ............... 396/177 |
| 4,508,440 | A | * | 4/1985 | Costa et al. ............... 396/350 |
| 5,287,135 | A | * | 2/1994 | Arai et al. ................ 396/174 |
| 5,426,478 | A | * | 6/1995 | Katagiri et al. ............ 396/176 |
| 5,463,437 | A | * | 10/1995 | Takami .................... 396/177 |
| 6,259,863 | B1 | | 7/2001 | Maruyama ................. 396/177 |
| 6,334,030 | B1 | * | 12/2001 | Mizumo et al. ............ 396/310 |
| 6,611,663 | B2 | * | 8/2003 | Nakagawa ................. 396/62 |

FOREIGN PATENT DOCUMENTS

| JP | 2000 171876 | 6/2000 | .......... G03B/17/04 |
| JP | 2002 158905 | 5/2002 | .......... H04N/5/225 |

* cited by examiner

*Primary Examiner*—W. B. Perkey
(74) *Attorney, Agent, or Firm*—Frommer Lawrence & Haug LLP; William S. Frommer; Leonard J. Santisi (57) ABSTRACT

The camera apparatus comprises a camera-body portion 1; a display pane 2 attached to the camera-body 1 as an outwardly fixing type with freely rotary operation; and a lens block 5 provided at the upper portion of the camera-body 1 and having a pop-up portion rotatable between a stored position within the camera-body 1 and a pop-up position by making a support-axis 14 as a support, wherein the lens block 5 is housed within the camera-body 1 when the camera is not in a taking-picture condition such that the lens surface protected by the outer body and lens block 5 is made up be a pop-up condition with an angle of a predetermined elevation-angle relative to the camera-body 1 when the camera is in a taking-picture condition.

5 Claims, 7 Drawing Sheets

FIG. 8

CAMERA APPARATUS

BACKGROUND OF THE INVENTION

1. Field of the Invention

The present invention relates to a camera apparatus suitable to be applied, for example, to a digital video camera apparatus which is made super-small sized and can record and reproduce with a high-density, and in more detail to such a camera apparatus where a lens block constituting an optical portion can pop-up with respect to a camera-body, the lens can be protected when it is in a housed condition and a holding feeling of the camera is improved when the camera is in a taking-picture condition.

2. Description of the Related Art

In the prior art, various types of video cameras and digital still cameras which were made super-small sized have been developed. However, in any of the cameras, a lens for taking pictures is arranged at the front face of the camera-body as a fixed type.

Additionally, for the lens of the conventional fixed type, the lens was protected by attaching a detachable cap to the lens tip portion or by building-in a shutter type barrier mechanism.

However, for the camera of the fixed type lens, other devices cannot be arranged at the lens front side, so that the camera grip position and another device area should be positioned or secured at other positions, and consequently it became an obstruction for a smaller sized camera.

Further, the detachable cap might be easily missed or the attaching and detaching operation thereof is troublesome, and the lens face side cannot be utilized for a space of other devices. Additionally, in case of the shutter type barrier mechanism it is avoided from the matter of missing and avoided from the troublesome matter of attaching and detaching, but the lens face side cannot be utilized for a space of other devices just same as the detachable cap case.

As mentioned above, various devices are arranged on the side surface or upper and lower surfaces of the camera-body and the grip region of the camera was secured at a portion other than the lens area.

In more detail, when a video camera having a fixed type lens at the front face side of the camera is taken as an example, the posture of a human hand will become a condition of bended to a direction of an approximately right angle when gripping the camera for taking a picture, so that it becomes a problem that the posture of this taking-picture causes weariness of the wrist such that it becomes painful to maintain a taking-picture condition for long hours.

SUMMARY OF THE INVENTION

The present invention is directed to solve the aforementioned problems and it is an object or a purpose of the present invention to obtain a camera apparatus where the optical portion is capable of being stored or housed inside of the camera-body when it is not in a taking-picture condition such that the lens surface can be protected, at the same time the camera-holding feeling is improved and it will not be painful to take pictures even for long hours.

The camera apparatus according to the present invention to attain the aforementioned purpose comprises a camera-body portion; display panel portion fixed to the camera-body portion; and an optical portion fixed to the upper portion of the camera-body portion and rotatable between a housed position in the camera-body portion and a pop-up position.

According to the abovementioned camera apparatus, the optical portion is housed inside of the camera-body portion when the camera is not in a taking-picture condition, so that the lens surface of the optical portion can be protected. In this way, the outer body portion of the camera facing to the lens surface can be secured as a grip region of the camera, so that it becomes possible to make the camera much smaller sized.

Additionally, when the camera is in a taking-picture condition, the optical portion is made popped-up to a predetermined elevation-angle, so that the camera-body portion is held in a forward-leaning posture and the lens light axis of the optical portion becomes a taking-picture condition facing to the subject. In this way, it becomes possible to take pictures in a natural posture during the taking-picture condition without bending a human wrist.

DESCRIPTION OF THE PREFERRED EMBODIMENT

An exemplified embodiment of a camera apparatus according to the present invention will be described hereinafter with reference to the drawings taking a super small sized digital video camera (hereinafter referred merely as a camera) as an example.

Figure 1:
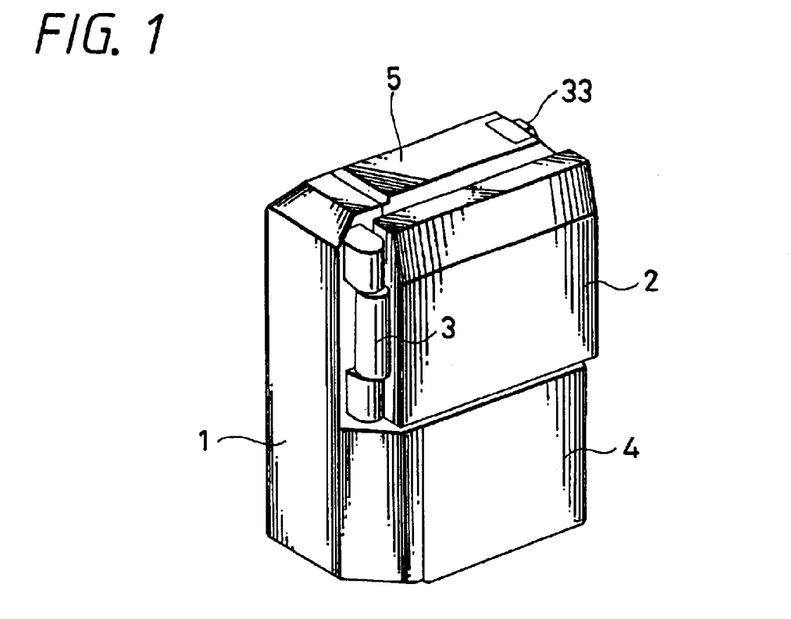
FIG. 1 is a perspective outward appearance view according to an exemplified embodiment showing a digital video camera when it is in a condition other than a taking-picture condition.
Figure 2:
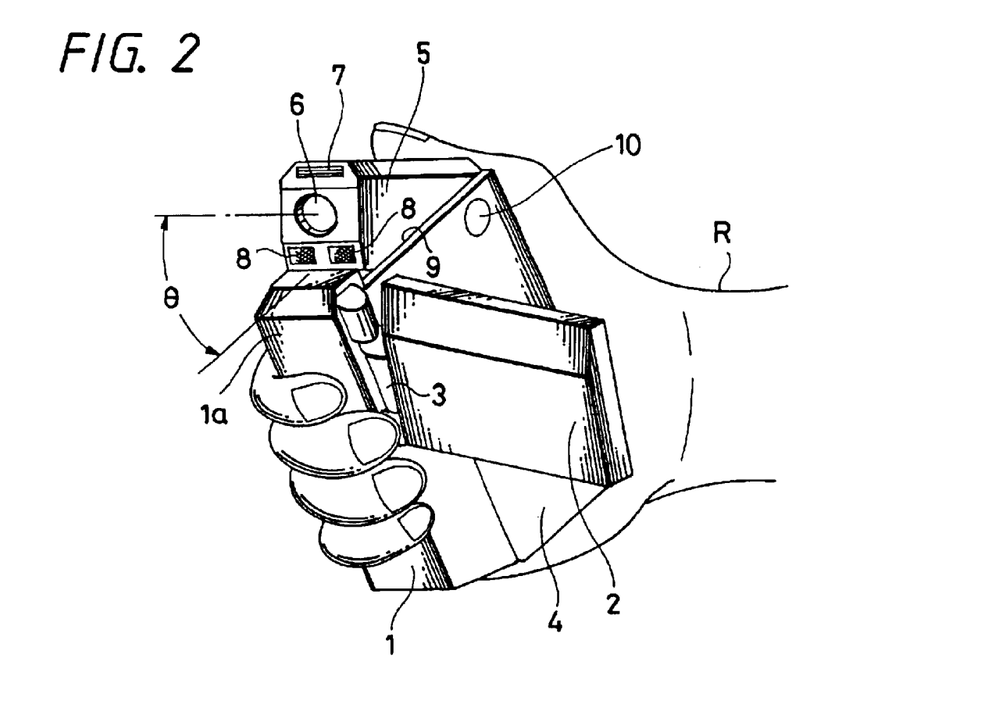
FIG. 2 is a perspective outward appearance view according to an exemplified embodiment showing a digital video camera when it is in a taking-picture condition.

FIG. 1 is a perspective outward appearance view when a camera is in a condition other than a taking-picture condition and FIG. 2 is a perspective outward appearance view when the camera is in a taking-picture condition.

A reference numeral 1 designates a camera-body and a recording and reproducing mechanism not shown is provided in the camera-body 1, a tape cassette of a recording medium can be put into and put out from an opening and closing door not shown. Further, an outwardly fixing type display panel 2 such as a liquid crystal display panel is attached to the camera-body 1 through a hinge portion 3 in a manner of freely opening/closing and freely rotational operation. Additionally, a battery pack 4 for a power supply is mounted on the camera-body 1 at a lower side portion of the display panel 2.

Further, the camera-body 1 has mode switching buttons for switching among a camera mode, a memory mode and a video mode and a zooming lever on the opposite side face thereof with respect to the display panel 2 side, while a taking-picture start/stop button and the like is arranged at the back face side of the camera-body 1. It should be noted that a viewfinder is not provided for the camera of this exemplified embodiment and taking-pictures are executed as seeing the pictures reproduced on the display panel 2.

Now a lens block 5 which is a specific portion according to the present invention is arranged at the upper portion of the camera-body 1. The lens block 5 is equipped with a front side lens 6, which is an optical object lens for taking a picture, (hereinafter referred as a lens surface 6) at the front surface side. Further, a strobe 7 is provided neighboring the upper portion of this lens surface 6 and a pair of left and right sound-collecting microphones 8 are provided neighboring the lower portion of this lens surface 6.

The lens block 5 is stored or housed inside of a lens block storing concave portion 9 provided at the upper surface of the camera-body 1 when the camera is not in a taking-picture condition as shown in FIG. 1, so that a portable and small sized version of a camera can be attained and at the same time the lens surface 6 will be protected by an outer body 1a at the front upper portion of the camera-body 1. Subsequently, when the camera is in a taking-picture condition, a pop-up button is operated such that a pop-up operation is executed to a direction of a predetermined elevation-angle, (e.g. around 30°) with respect to a support of a support-axis 10 (an axis corresponding to an axis 14 described hereinafter) such that the lens surface 6 will be exposed from the upper portion of the camera-body 1.

Figure 3:
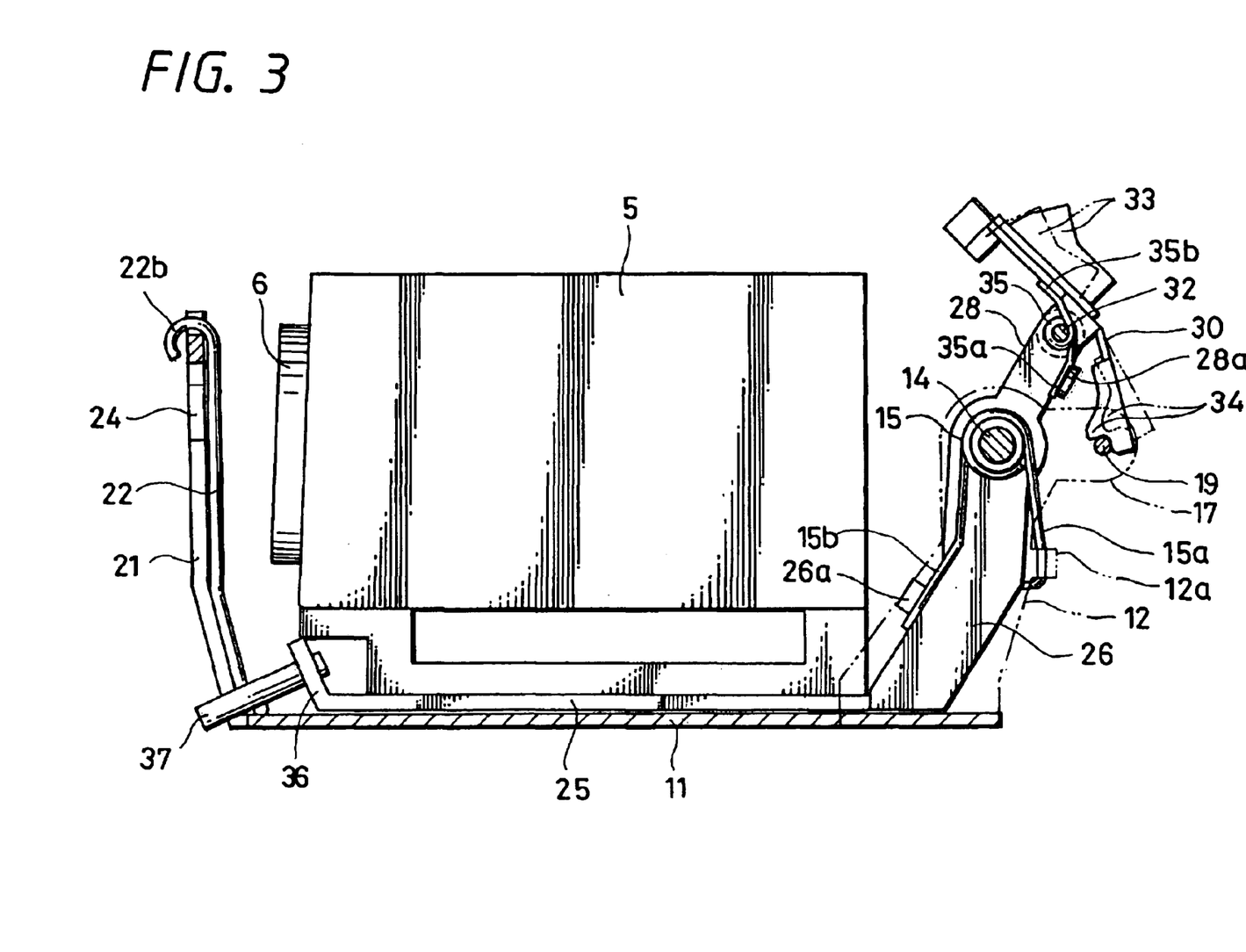
FIG. 3 is a partial cross-sectional side view in an enlarged form showing a lens block in its housed condition.
Figure 4:
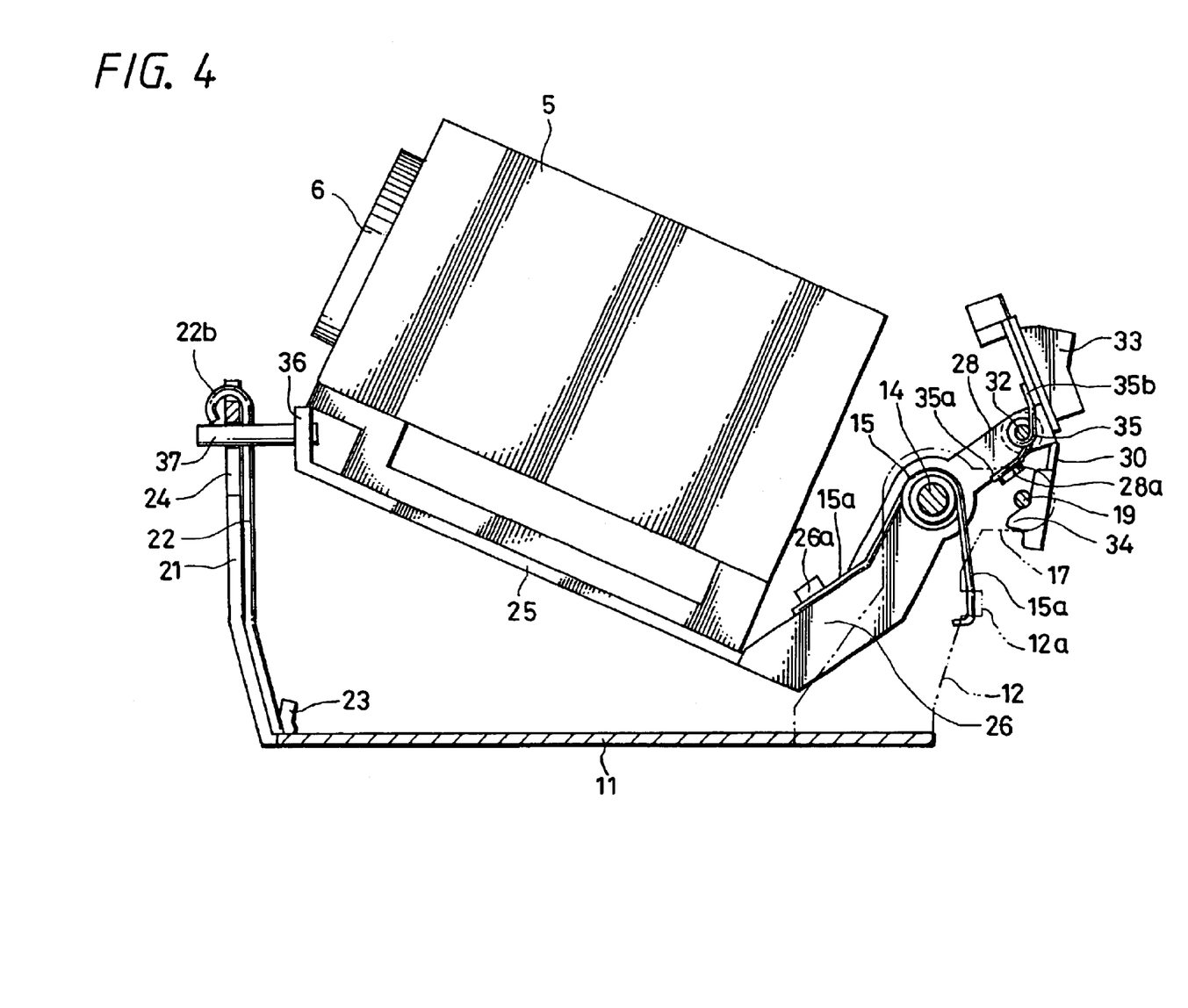
FIG. 4 is also a partial cross-sectional side view in an enlarged form showing a lens block in its pop-up condition.
Figure 7:
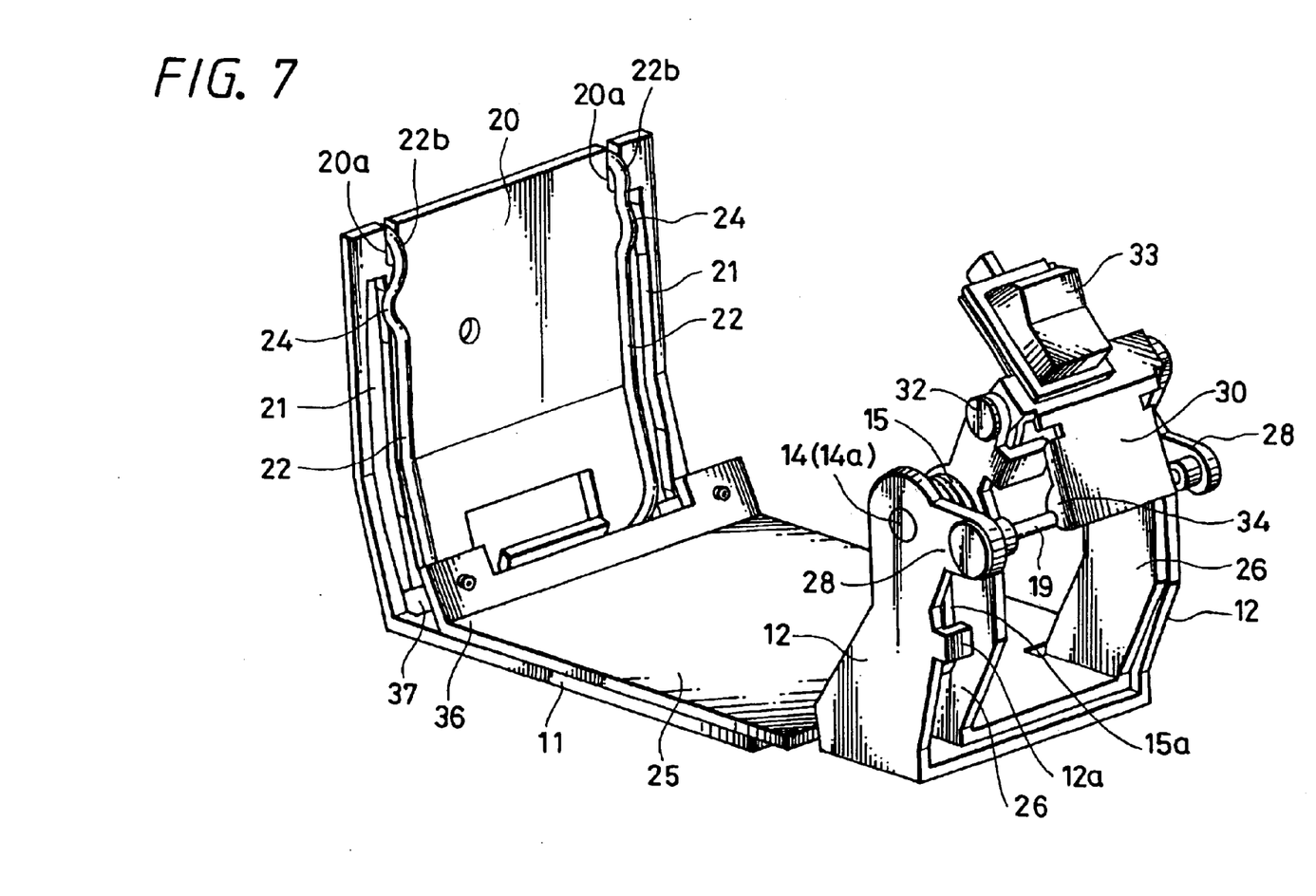
FIG. 7 is a perspective view seen from the rear side when a fixed side metal plate member and a movable side metal plate member are mounted for a lens block.
Figure 8:
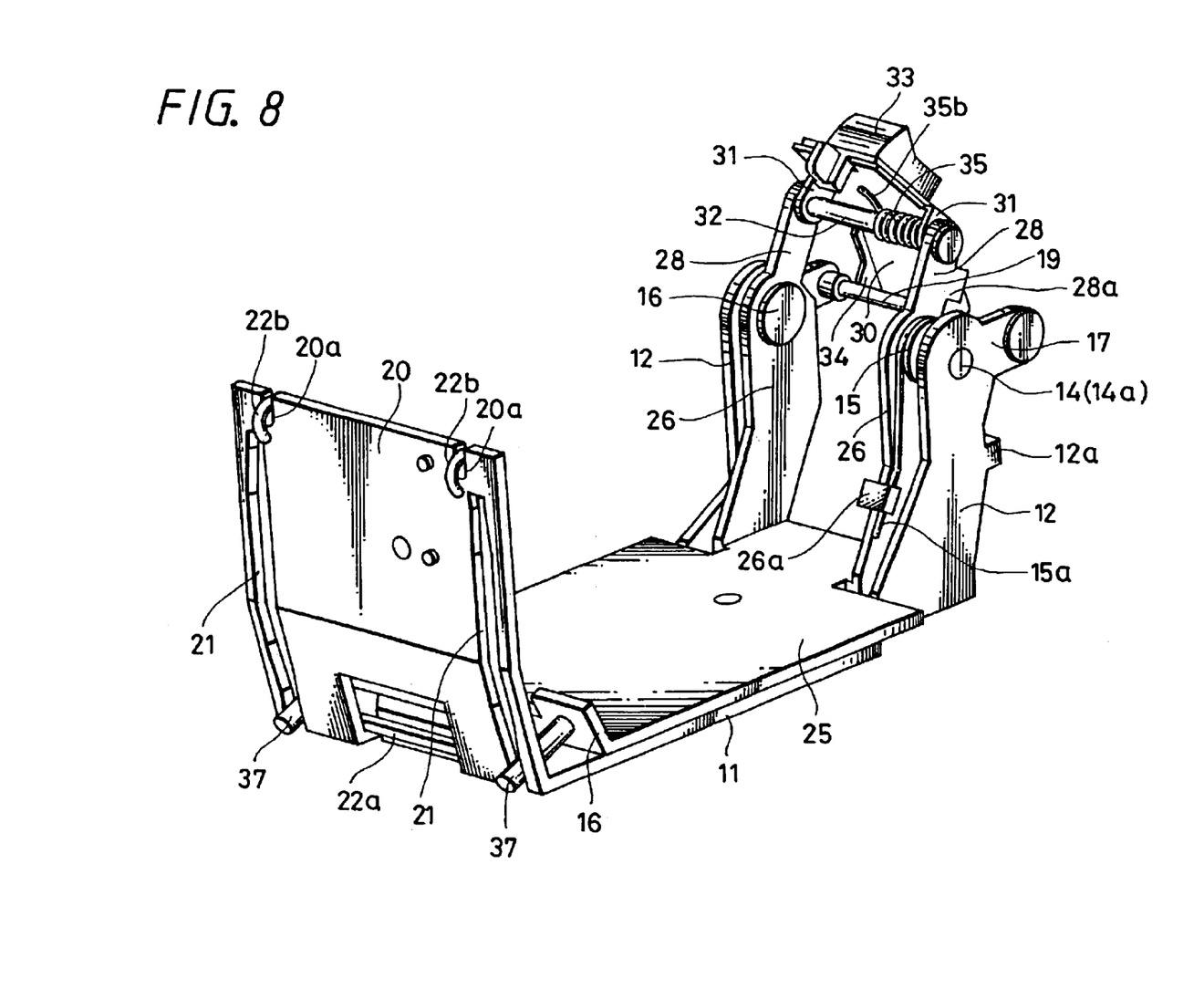
FIG. 8 is a perspective view seen from the front side when a fixed side metal plate member and a movable side metal plate member are mounted for a lens block.

Next, the pop-up mechanism of the lens block 5 will be described in detail with respect to FIGS. 3 to 8. FIG. 3 is a partial cross-sectional side view in an enlarged form when the lens block 5 is in its housed condition, FIG. 4 is a partial cross-sectional side view in an enlarged form when the lens block 5 is in its pop-up condition, FIG. 5 is a perspective view showing a pop-up mechanism of a fixed side metal plate member in a separated condition, FIG. 6 is a perspective view showing a movable side metal plate member to which the lens block 5 is mounted in its separated condition, FIG. 7 is a perspective view of the housed position seen from the rear side when a fixed side metal plate member and a movable side metal plate member are mounted, and FIG. 8 is also a perspective view of the housed position seen from the front side thereof.

Figure 5:
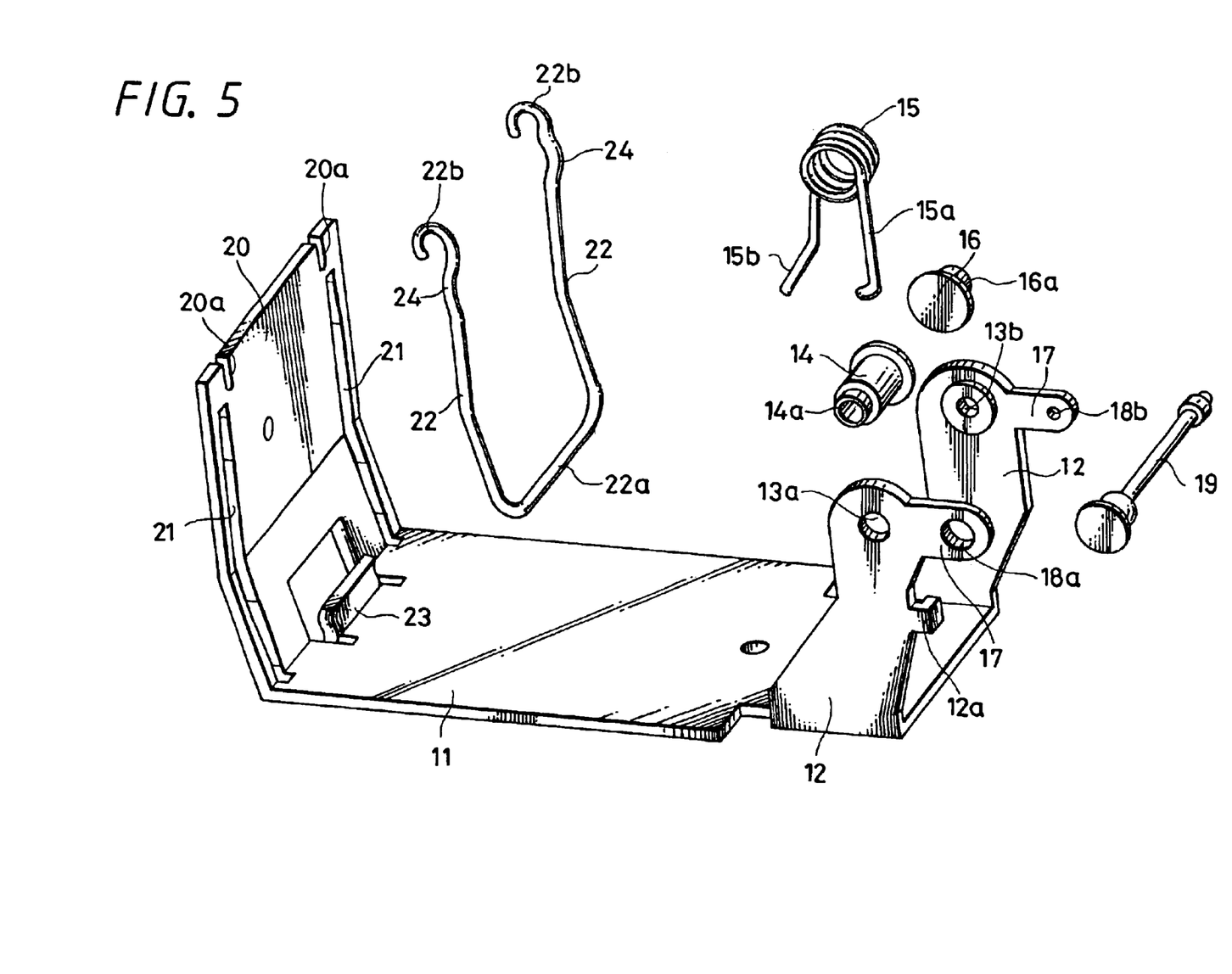
FIG. 5 is a perspective view showing a fixed side metal plate member of a lens block in a separated condition.

In FIG. 5, a reference numeral 11 denotes a base plate of a fixed side metal plate member which is fixed to a bottom portion of a lens block storing concave portion 9 by means of a screw not shown. A pair of side plates 12, 12 are bended up at the rear edge portion (right edge portion in the figure) of the base plate 11 with one-body configuration. Further, an axis 14 is caulking-fixed to an axial hole 13a formed at the upper portion of one side plate 12 in a condition that a first coil spring 15 is mounted thereon. At the same time, an axis 16 is caulking-fixed to an axial hole 13b formed at the upper portion of the other side plate 12. The above mentioned caulking-fixing of the axis 14 and the axis 16 to the axial hole 13a and the axial hole 13b is performed or executed through axial holes of side plates of a movable side metal plate which will be described hereinafter. Further, arms 17, 17 are elongated from the upper edge portions of the side plates 12, 12 to the rear side; a locking-axis pin 19 is inserted from a bigger hole (axial hole 18a) side to axial holes 18a, 18b which are formed at the tip side thereof; and it is caulking-fixed at the axial hole 18b side.

Additionally, a sleeve-plate 20 is bended up with one-body configuration at the front edge portion of the base plate 11 so as to incline a little bit to the outward direction and guide grooves 21, 21 are formed in the vicinity of the left and right side portions of the sleeve-plate 20. Further, a wire members 22, 22 formed as U-shaped are provided inside of both the guide grooves 21, 21 in such a manner that a connecting portion 22a thereof is held between the sleeve-plate 20 and a latching or hooking piece 23 bended up from the base plate 11 and bended portions 22b, 22b which are formed at both sides of the wire member 22, 22 are latched or hooked and fixed at slit-grooves 20a, 20a of the sleeve-plate 20. Convex-shaped curved surface portions 24, 24 are formed near the upper edge of the spring members 22, 22 in such a manner that they project to the direction of the aforementioned guide grooves 21, 21.

Figure 6:
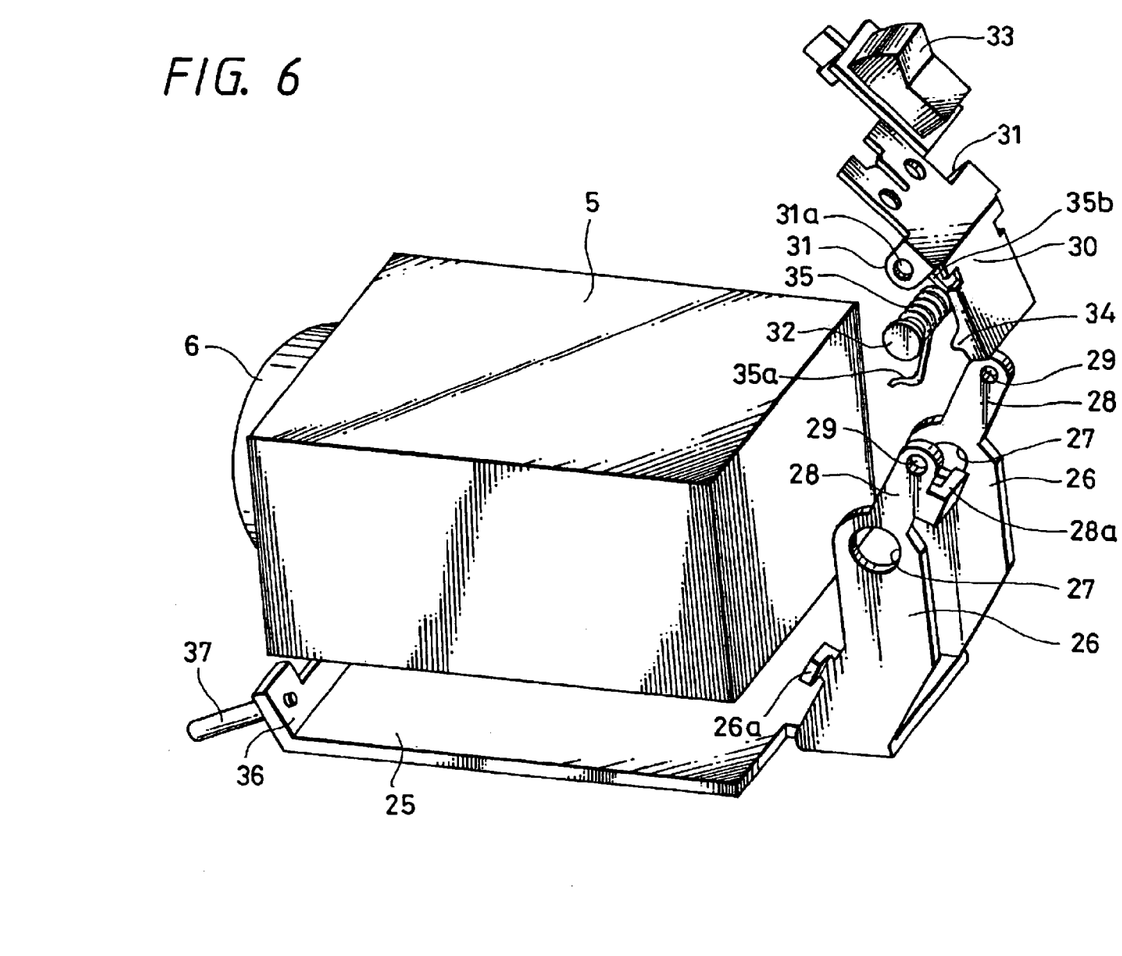
FIG. 6 is a perspective view showing a movable side metal plate member of a lens block in its separated condition.

On the other hand, in FIG. 6, a reference numeral 25 is a base plate of a movable side metal plate member and the lens block 5 is fixed on the base plate 25. A pair of side plates 26, 26 are bended up at the rear edge portion (right edge portion in the figure) of the base plate 25 with one-body configuration and axial holes 27, 27 are formed at the upper portions of both the side plates 26, 26 respectively. Further, bearing arms 28, 28 are formed in such a manner that they project to a direction to the rear side from the upper edge portions of the side plates 26, 26 with some inclination and axial holes 29, 29 are formed at the tip portions thereof. A A-shaped rocking plate 30 is supported or mounted to the axial holes 29, 29 by means of an axial pin 32 through holes 31a, 31a of bearing plates 31, 31 rocking availably and a pop-up button 33 is supported on one upper side surface of the plate 30. Additionally, a locking claw 34 is provided on a lower side piece of the rocking plate 30.

A second coil spring 35 is mounted on the axis pin 32. One terminal 35a of the second coil spring 35 is hooked and fixed to a spring hooking piece 28a provided at one of the bearing arms 28 and the other terminal 35b is hooked and fixed to the rear surface of the rocking plate 30. Consequently, the rocking plate 30 is made biased to a clock wise direction by the spring force of the second coil spring 35.

Further, at the front edge side of the base plate 25, a pair of left and right guide pins 37, 37 (see FIG. 8) are mounted with downward inclination onto mounting plates 36 which are bended with one-body configuration therewith. The distance between the guide pins 37, 37 is made equal to the distance between the abovementioned guide grooves 21, 21 at the fixed side metal plate 11.

Here, the process of mounting the movable side metal plate member 25 to the fixed side metal plate member 11 is first the guide pins 37, 37 of the movable side metal plate member 25 are inserted into the slit-grooves 21, 21 of the sleeve-plate 20 of the fixed side metal plate member 11. Thereafter, the axis 14 mounted with the first coil spring 15 is caulking-fixed to the axial hole 13a of the one side plate 12 of the fixed side metal plate member 11 through the axial hole 27 of the one side plate 26 of the movable side metal plate member 25. Similarly, the axis 16 is caulking-fixed to the axial hole 13b of the other side plate 12 of the fixed side metal plate member 11 through the axial hole 27 of the other side plate 26 of the movable side metal plate member 25. Then, the one terminal 15a of the first coil spring 15 is hooked and fixed to the spring hooking piece 12a of the side plate 12 of the fixed side metal plate member 11 and the other terminal 15b of the first coil spring 15 is hooked and fixed to the spring hooking piece 26a of the side plate 26 of the movable side metal plate member 25.

Here, the movable side metal plate member 25 together with the lens block 5 executes a pop-up operation with an elevation-angle and a housed and locked operation to the stored position by means of the spring bias force of the first coil spring 15 by making or using the axis 14 as a support for rotation.

In a housed condition of the lens block 5, as shown in FIG. 3, the locking claw 34 of the rocking plate 30 which is biased to a clockwise direction is engaged or latched to the locking-axis pin 19 and the housed condition is maintained. At this time the guide pins 37, 37 of the movable side metal plate member 25 are positioned at the lower side of the slit-grooves 21, 21 of the fixed side metal plate member 11.

At this time when the pop-up button 33 is pushing operated and the rocking plate 30 is rotated to a counter clockwise direction, the locking claw 34 retreats from the locking-axis pin 19 as shown by imaginary lines and the locking is released. At the same time the movable side metal plate member 25 together with the lens block 5 are executed with a pop-up operation to the pop-up position in accordance with the guide pin 37, 37 guided along the guide groove 21, 21 as shown in FIG. 4. In this pop-up position of the lens block 5, the guide pins 37, 37 are maintained at the pop-up position in a condition that they go over the curved surface portion 24, 24.

When the lens block 5 is housed in the stored position from the pop-up position, the lens block 5 is pushed down by hand against the spring force of the first coil spring 15. In this way the locking claw 34 will again be engage with the locking-axis pin 19 to be maintained in a housed condition as shown in FIG. 3.

For the abovementioned camera, the lens surface 6 has an elevation-angle of around 30° with respect to the camera-body 1. Therefore, when the lens surface 6 is made just directed to the subject for a taking-picture condition, the camera-body 1 will be in a grip condition held by hand to somewhat a downward direction as shown in FIG. 2. The posture of the hand this time becomes in a natural condition where the wrist R is just straight and it is avoided from a conventional condition where the wrist is bended to an upper direction, so that it does not cause weariness even after taking-pictures long hours and it becomes possible to improve a holding feeling of a camera.

Additionally, the lens block 5 is housed within the lens block storing concave portion 9 at the upper face side of the camera-body 1 when the camera is not in a taking-picture condition as shown in FIG. 1, so that the lens surface 6 is protected by the outer body 1a at the front upper portion and at the same time, the strobe 7 and the sound-collecting microphones 8 arranged and positioned neighboring the upper portion and the lower portion of the lens surface 6 can be also protected. Based on this fact, a portable and small-sized version of a camera is attained.

Further, as the lens surface 6 is protected by the outer body 1a at the upper and front face side of camera-body 1 when it is in a housed condition, so that a portion of the outer body 1a which was a lens portion of a conventional camera in a taking-picture condition can be secured as a grip region of a camera.

Furthermore, for the abovementioned camera-body 1, it is possible to arrange devices such as operation buttons, a speaker, sound-collecting microphones and a strobe in a portion of the outer body 1a which was a lens portion of a conventional camera, so that it becomes possible to obtain a much smaller-sized camera.

Additionally, it is naturally possible to shut off the power supply of the camera in cooperation with the housing operation of the lens block 5 into the camera-body 1 and to put on the power supply of the camera in cooperation with the pop-up operation of the lens block 5.

According to the exemplified embodiment of the present invention, the lens block 5 is executed with a pop-up operation by the spring force of the first coil spring 15, but it is possible to execute the pop-up operation by a spring plate or an electromagnetic solenoid other than a coil spring.

Further, according to the exemplified embodiment of the present invention, the lens block 5 is made to be a pop-up condition with an angle of a predetermined elevation-angle by making the axis 14 as a support for rotation, but it is possible to make the lens block 5 rotate 180° to the opposite side such that the lens surface 6 is directed to the person side of taking-pictures.

Further, it is possible to adapt other than a mechanism where a lens block 5 is made to be a pop-up condition with an angle of a predetermined elevation-angle, that is, to adapt a system where a lens block is popped-up vertically from the upper face of the camera-body 1 or a system where a lens block is pulled out slidably from the side face of the camera-body 1.

Furthermore, according to the exemplified embodiment of the present invention, a case of a super small sized digital video camera is described, but it is also widely applicable to other apparatuses such as a digital still camera. In this case the display panel is arranged by being fixed to the camera-body.

As explained above, the camera apparatus according to the present invention is provided with a camera-body portion, a display panel portion mounted to camera-body portion, and an optical portion rotatable between a housed position within the camera-body portion and a pop-up position; and therefore the optical portion is housed within the camera-body portion when the camera is not in a taking-picture condition such that the lens surface of the optical portion can be protected by the outer body, and the outer body portion facing to the lens surface can be secured as a grip region of the camera, so that it has an effect to make a camera much smaller-sized.

Further, as the optical portion is popped-up to an angle of a predetermined elevation-angle, the camera-body portion is maintained in a forward-leaning posture when taking-pictures while the lens light axis of the optical portion is made directed to the subject as a taking-picture condition. Consequently, it becomes possible to take pictures with a natural posture without bending the wrist when taking pictures.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A camera apparatus comprising:
   a camera body portion;
   a display panel portion fixed to said camera body portion;
   an optical portion including an optical lens for taking a picture disposed at an upper portion of said camera body portion and having a pop-up portion pivotable between a closed housed position in said camera-body portion and a pop-up open position;
   wherein when said camera apparatus is in said closed housed position said lens is protected by an outside body portion;

wherein when said camera apparatus is in said pop-up open position said optical portion is exposed in a picture taking mode; and said lens when in said pop-up open position is disposed such that a light axis of said lens is inclined with respect to a direction parallel to a surface of said camera body on which the fingers of a user are placed when the user holds said camera body portion for taking a picture, whereby said camera body portion is held by the user in a forward leaning posture.

2. A camera apparatus according to claim 1, wherein said camera-body portion is held in a forward-leaning posture when it is in a taking-picture condition such that the light axis of the front side lens of said optical portion is made directly faced to the subject, so that holding feelings is improved in the taking-picture condition.

3. A camera apparatus according to claim 1, wherein at least one of a strobe and a sound-collecting microphone is disposed near the front side lens of said optical portion.

4. A camera apparatus according to claim 1, wherein the outer body portion by which the front side lens of said optical portion is protected becomes a grip region of said camera-body portion.

5. A camera apparatus according to claim 1, wherein at least one of a sound-collecting microphone and a strobe is positioned at the outer body portion by which the front side lens of said optical portion is protected.

* * * * *